United States Patent
Nilsson et al.

(10) Patent No.: US 12,090,823 B2
(45) Date of Patent: Sep. 17, 2024

(54) VEHICLE DOOR HINGE FOR A VEHICLE DOOR, A TAILGATE HINGE, A SIDE DOOR HINGE AND A VEHICLE

(71) Applicants: Ningbo Geely Automobile Research & Development Co., Ltd., Ningbo (CN); Zhejiang Geely Holding Group Co., Ltd., Zhejiang (CN)

(72) Inventors: Magnus Nilsson, Floda (SE); Måns Pihlsgård, Gothenburg (SE); Jonathan Johansson, Gothenburg (SE)

(73) Assignees: Ningbo Geely Automobile Research & Dev. Co., Ltd., Ningbo (CN); Zhejiang Geely Holding Group Co., Ltd., Zhejiang (CN)

( * ) Notice: Subject to any disclaimer, the term of this patent is extended or adjusted under 35 U.S.C. 154(b) by 295 days.

(21) Appl. No.: 17/838,989

(22) Filed: Jun. 13, 2022

(65) Prior Publication Data
US 2022/0307311 A1 Sep. 29, 2022

Related U.S. Application Data

(63) Continuation of application No. PCT/CN2020/137156, filed on Dec. 17, 2020.

(30) Foreign Application Priority Data

Dec. 19, 2019 (EP) .................................... 19218250

(51) Int. Cl.
*B60J 5/10* (2006.01)
*E05D 11/08* (2006.01)
(Continued)

(52) U.S. Cl.
CPC ............... *B60J 5/10* (2013.01); *E05D 11/082* (2013.01); *E05D 11/1007* (2013.01);
(Continued)

(58) Field of Classification Search
CPC ............... E05D 11/082; E05D 11/1085; E05D 11/1007; E05D 11/1035
(Continued)

(56) References Cited

U.S. PATENT DOCUMENTS

| 6,398,288 B1 | 6/2002 | Yuge |
| 6,510,587 B2* | 1/2003 | Urschel ..................... E05F 5/02 16/83 |

(Continued)

FOREIGN PATENT DOCUMENTS

| CN | 201771318 U | 3/2011 |
| CN | 102996002 A | 3/2013 |

(Continued)

OTHER PUBLICATIONS

International Search Report from corresponding International Application No. PCT/CN2020/137156, mailed on Mar. 16, 2021, 3 pages.

*Primary Examiner* — Dennis H Pedder
(74) *Attorney, Agent, or Firm* — Tucker Ellis LLP

(57) ABSTRACT

A vehicle door hinge for a vehicle door opening vertically includes a first hinge part attached to a vehicle frame having a pivot attachment means, a second hinge part attached to the door attached to the pivot attachment means to allow the second hinge part to rotate the door in an opening or closing direction, a stopper part attached to the pivot attachment means at a distance from a mass centre of the stopper part, a locking mechanism for locking the stopper part position relative the second hinge part. The locking mechanism is moveable between an unlocked position and a locked position. The stopper part in the unlocked position is arranged to be moved by gravity to a resting position where it is adjacent or abutting the first hinge part and stopped by the first hinge part from rotating in the opening direction but free to rotate in the other direction.

16 Claims, 3 Drawing Sheets

(51) Int. Cl.
*E05D 11/10* (2006.01)
*E05F 1/12* (2006.01)
*E05F 15/43* (2015.01)
*E05F 15/48* (2015.01)
*E05F 15/60* (2015.01)
*E05F 15/75* (2015.01)
*E05F 15/73* (2015.01)

(52) U.S. Cl.
CPC ........ *E05D 11/1085* (2013.01); *E05F 1/1292* (2013.01); *E05F 15/43* (2015.01); *E05F 15/48* (2015.01); *E05F 15/60* (2015.01); *E05F 15/75* (2015.01); *E05F 2015/434* (2015.01); *E05F 2015/765* (2015.01); *E05Y 2900/546* (2013.01)

(58) Field of Classification Search
USPC .............. 16/49, 320, 329, 330, 334; 49/394; 296/56, 146.8, 106
See application file for complete search history.

(56) References Cited

U.S. PATENT DOCUMENTS

| | | | |
|---|---|---|---|
| 7,355,365 B2* | 4/2008 | Platzkoester | E05F 15/63 |
| | | | 296/76 |
| 7,870,643 B2 | 1/2011 | Krueger | |
| 2007/0024431 A1 | 2/2007 | Touge | |
| 2009/0070964 A1* | 3/2009 | Rudzewski | E05D 11/06 |
| | | | 16/374 |

FOREIGN PATENT DOCUMENTS

| | | |
|---|---|---|
| CN | 204266735 U | 4/2015 |
| CN | 204850840 U | 12/2015 |
| CN | 205297107 U | 6/2016 |
| CN | 209556681 U | 10/2019 |
| CN | 209723968 U | 12/2019 |
| DE | 102012024931 A | 6/2014 |

* cited by examiner

VEHICLE DOOR HINGE FOR A VEHICLE DOOR, A TAILGATE HINGE, A SIDE DOOR HINGE AND A VEHICLE

RELATED APPLICATION DATA

This application is a continuation of International Patent Application No. PCT/CN2020/137156, filed Dec. 17, 2020, which claims the benefit of European Patent Application No. 19218250.9, filed Dec. 19, 2019, the disclosures of which are incorporated herein by reference in their entireties.

TECHNICAL FIELD

The present disclosure relates to a vehicle door hinge for a vehicle door opening vertically, a tailgate hinge, a side door hinge and a vehicle.

BACKGROUND

When parking a vehicle in a parking lot or garage building space is often limited both horizontally and vertically. In some cases the ceiling or surrounding structures present obstacles when opening the tailgate to get access to the trunk or luggage room of the vehicle. If the vehicle user is not careful, the tailgate may hit an obstacle when opening the tailgate damaging the vehicle.

Modern cars often have electrically operated tailgates opened by pressing a button inside the driver compartment. These electrically operated tailgates have sensors that will stop the electrical motor driving the tailgate if the ceiling is too low to open the tailgate completely.

However, for manual tailgates, the solution used for the electrically operated tailgates cannot be used as no electrical motor is present to control the tailgate movement.

There is thus a need for improvements for manual tailgates for vehicles so that damages of the tailgate can be avoided when parking in garages with low ceilings or in parking spaces with other obstacles.

SUMMARY

It is an object of the present disclosure to mitigate, alleviate or eliminate one or more of the above-identified deficiencies and disadvantages in the prior art and solve at least the above mentioned problem. According to a first aspect there is provided a vehicle door hinge for a vehicle door opening vertically, comprising: a first hinge part adapted to be attached to a vehicle frame comprising a pivot attachment means, a second hinge part adapted to be attached to the vehicle door attached to the pivot attachment means of the first hinge part configured to allow the second hinge part to rotate the vehicle door in an opening direction or closing direction between a closed position and an open position, a stopper part attached to the pivot attachment means of the first hinge part at a distance from a mass centre of the stopper part, a locking mechanism for locking the stopper part position relative the second hinge part, wherein the locking mechanism is moveable between an unlocked position and a locked position, wherein the stopper part in the unlocked position is arranged to be moved by gravity to a resting position where it is adjacent or abutting the first hinge part and stopped by the first hinge part from rotating in the opening direction but free to rotate in the other direction so that when the locking mechanism is in the locked position the second hinge part, and hence also the vehicle door, is stopped from movement in the opening direction.

A mechanical lock that at any time can lock the tailgate is achieved. Thus as soon as the locking mechanism is actuated to move the locking mechanism to the locked position, second hinge part will be locked to the stopper part and the opening movement will be stopped by the stopper part abutting the first hinge part. The problem of the prior art is thereby solved and a stopping mechanism that works for a mechanical tailgate is achieved.

According to some embodiments, the vehicle comprises a sensor configured to determine a distance to an object and to actuate the locking mechanism to transit from the unlocked position to the locked position when the determined distance is shorter than a predetermined distance.

The locking mechanism is thereby actuated before the tailgate hits the detected object thus hindering that the tailgate is damaged.

According to some embodiments, the locking mechanism is actuated electrically based on: a signal from the sensor, a signal from a user-operated button as e.g. long press of the close button, a signal from the vehicle control system based on a setting for maximum opening position as e.g. a user setting or a user setting for a geographical position.

The signal from a user-operated button as e.g. long press of the close button may be used to stop an opening from the driver seat if the driver sees a problem. The signal from the vehicle control system based on a setting for maximum opening position as e.g. a user setting or a user setting for a geographical position can be used if the tailgate always should be hindered from being opened more than to certain degree or if the geographical location is known to have a low ceiling, e.g. a known parking garage.

According to some embodiments, the sensor is a sensor comprised in the group of: an IR-sensor, a radar, LIDAR, an ultrasound transceiver, laser sensor, mechanical pressure sensor. The sensor type may be selected based on budget and performance required. They will all actuate the locking mechanism when detecting an object on a predetermined distance. The mechanical pressure sensor will detect the object on first impact, which may be enough, e.g. if the sensor protrudes out from the door a distance.

According to some embodiments, the locking mechanism comprises two discs where the discs lockingly engage each other in the locked position. Thus when the discs are pressed together in the locking position relative movement between the discs is not possible.

According to some embodiments, the locking mechanism further comprises bias means for biasing of the discs to the locked position. Thus when the discs are not actively pulled apart, the discs will be moved together into the locking position.

According to some embodiments, the bias means is a spring or a resilient member, which is a suitable mechanical way to facilitate a biasing not requiring electricity or other power sources.

According to some embodiments, the locking mechanism further comprises an electromagnet for pulling the discs apart in an unlocked state. The electromagnet needs to be stronger than the force applied by the biasing means to pull the discs apart. With this setup the discs will move back to the locked position in case of power loss, which may be preferred.

According to some embodiments, the locking mechanism further comprises bias means for biasing of the discs to the unlocked position. Thus when the discs are not actively pulled together, the discs will be moved together into the unlocked position.

According to some embodiments, the locking mechanism further comprises an electromagnet for pulling the discs together in a locked state. The electromagnet needs to be stronger than the force applied by the biasing means to pull the discs together into the locked position. With this setup the discs will move back to the unlocked position in case of power loss, which may be preferred, e.g. if it is not acceptable that the tailgate is locked at power loss.

According to a second aspect there is provided a tailgate hinge comprising the vehicle door hinge according to the first aspect. The tailgate hinge is intended to be fitted to a tailgate of a vehicle. According to some embodiments, the tailgate has a gas spring actuator for opening the tailgate. In that way the tailgate is easier to open, or if the gas spring actuator is strong enough, no manual force is needed to open the tailgate. The tailgate, however need to be manually or otherwise closed by a force overcoming the force of the gas spring actuator.

According to a third aspect there is provided a side door hinge comprising a first hinge part adapted to be attached to a vehicle frame comprising a pivot attachment means, a second hinge part adapted to be attached to the vehicle door attached to the pivot attachment means of the first hinge part configured to allow the second hinge part to rotate the vehicle door in an opening direction or closing direction between a closed position and an open position, a stopper part attached to the pivot attachment means of the first hinge part at a distance from a mass centre of the stopper part, a locking mechanism for locking the stopper part position relative the second hinge part, wherein the locking mechanism is moveable between an unlocked position and a locked position, wherein the stopper part in the unlocked position is biased to be moved to a resting position where it is adjacent or abutting the first hinge part and stopped by the first hinge part from rotating in the opening direction but free to rotate in the other direction. The hinge is basically the same as the one described in the first aspect. However, when the vehicle hinge is used on a side door opening in the horizontal plane, gravity will not act on the stopper part requiring a second bias means, e.g. a spring, to be moved to a resting position where it is adjacent or abutting the first hinge part and stopped by the first hinge part from rotating in the opening direction but free to rotate in the other direction. Otherwise the hinge will function identical to the case where it is used for a tailgate. That is, the side door will be protected from hitting obstacles as e.g. an adjacent car.

According to a fourth aspect there is provided a vehicle comprising the vehicle door hinge according to the first aspect, a tailgate hinge according to the second aspect, or a side door hinge according to the third aspect.

Effects and features of the second through fourth aspects are to a large extent analogous to those described above in connection with the first aspect. Embodiments mentioned in relation to the first aspect are largely compatible with the second through fourth aspects.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 1:
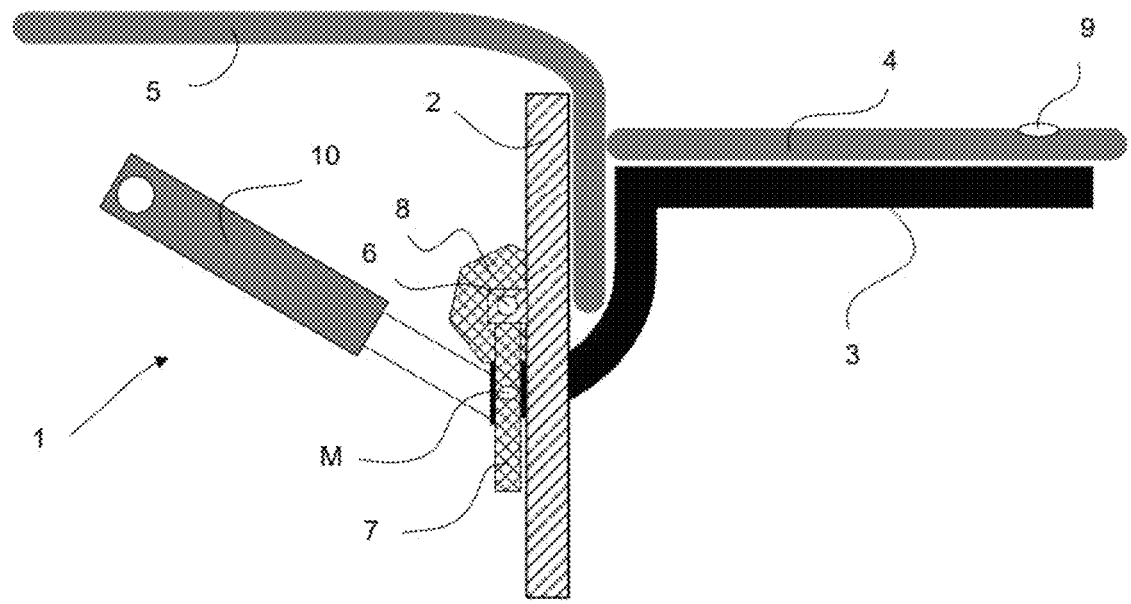
FIG. 1 shows a cross-sectional view of a vehicle door hinge for a vehicle door according to an embodiment of the present disclosure where the hinge is fully open.
Figure 2:
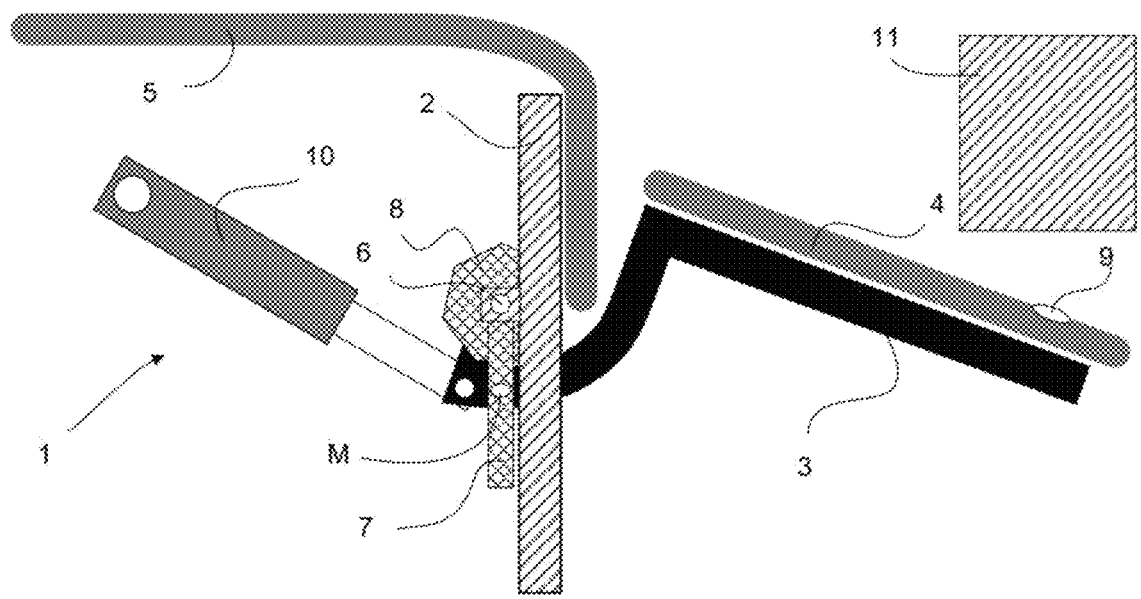
FIG. 2 shows a cross-sectional view of a vehicle door hinge for a vehicle door according to an embodiment of the present disclosure where the hinge is almost fully open and close to an obstacle.
Figure 3:
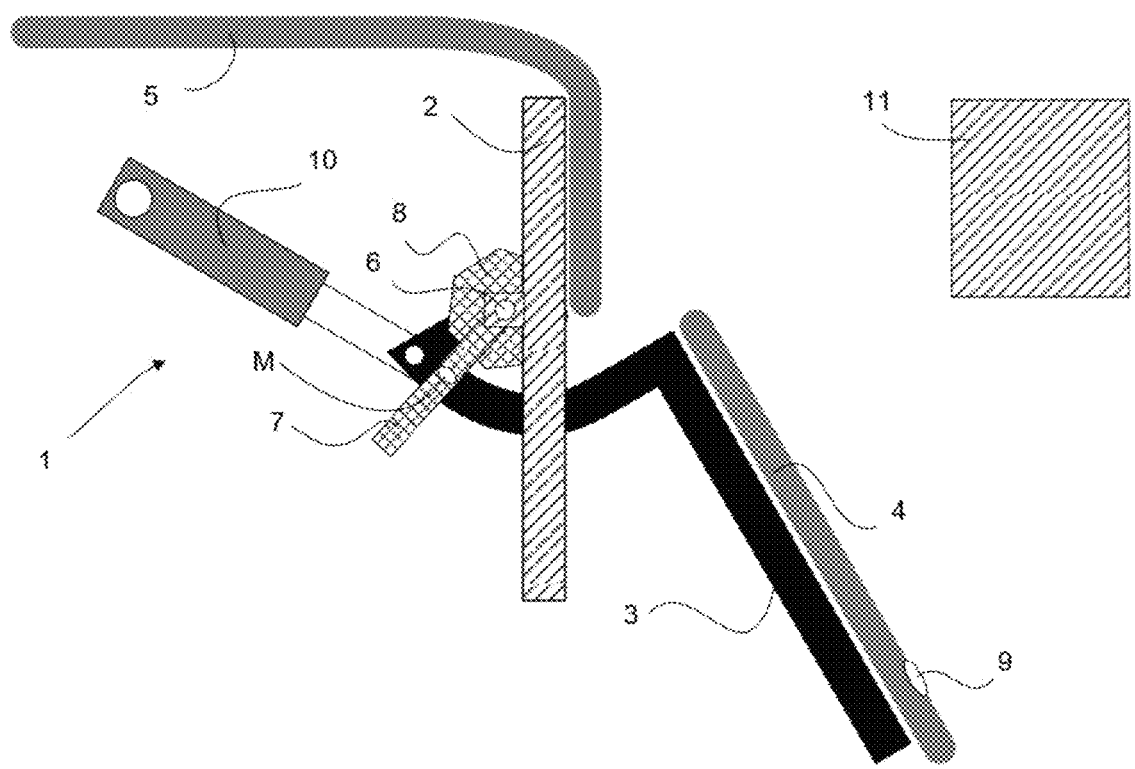
FIG. 3 shows a cross-sectional view of a vehicle door hinge for a vehicle door where the hinge is locked to a maximum opening angle corresponding to the opening angle of FIG. 2.

FIGS. 1-3 shows a vehicle door hinge 1 for a vehicle door 4 opening vertically. The vehicle door hinge 1 comprises a first hinge part 2 adapted to be attached to a vehicle frame 5 comprising a pivot attachment means 6, and a second hinge part 3 adapted to be attached to the vehicle door 4 attached to the pivot attachment means 6 of the first hinge part 2 configured to allow the second hinge part 3 to rotate the vehicle door 4 in an opening direction or closing direction between a closed position and an open position. The vehicle door hinge further comprises a stopper part 7 attached to the pivot attachment means 6 of the first hinge part 2 at a distance from a mass centre M of the stopper part 7, and a locking mechanism 8 for locking the stopper part 7 position relative the second hinge part, wherein the locking mechanism 8 is moveable between an unlocked position and a locked position. In the unlocked position the stopper part 7 is arranged to be moved by gravity to a resting position where it is adjacent or abutting the first hinge part 2 and stopped by the first hinge part 2 from rotating in the opening direction but free to rotate in the other direction so that when the locking mechanism 8 is in the locked position the second hinge part 3, and hence also the vehicle door, is stopped from movement in the opening direction. The lock mechanism 8 will thus physically lock the stopper part 7 in the locked position so that it no longer can rotate freely. The vehicle door 4 is schematically drawn as the upper part of a tailgate in the Figures.

The vehicle door hinge 1 in FIGS. 1-3 further comprises a sensor 9 configured to determine a distance to an object (11) and to actuate the locking mechanism 8 to transit from the unlocked position to the locked position when the determined distance is shorter than a predetermined distance. The locking mechanism may be actuated electrically based on a signal from the sensor 9, a signal from a user-operated button e.g. long press of the close button, or a signal from the vehicle control system based on a setting for maximum opening position e.g. a user setting, a user setting for a geographical position. The sensor 9 is a sensor comprised in the group of: an IR-sensor, a radar, LIDAR, an ultrasound transceiver, laser sensor, mechanical pressure sensor.

The vehicle door hinge 1 further has a gas spring actuator for help opening the vehicle door hinge 1 and the vehicle door or tailgate.

Figure 4A:
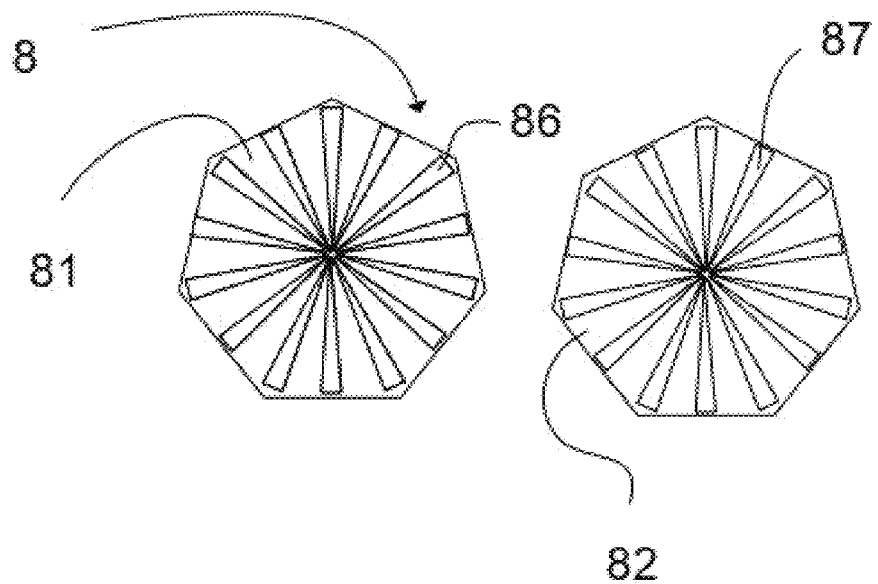
FIG. 4A shows a top view of the inside of the two discs of the locking mechanism of the vehicle door hinge according to an embodiment of the present disclosure.
Figure 4B:
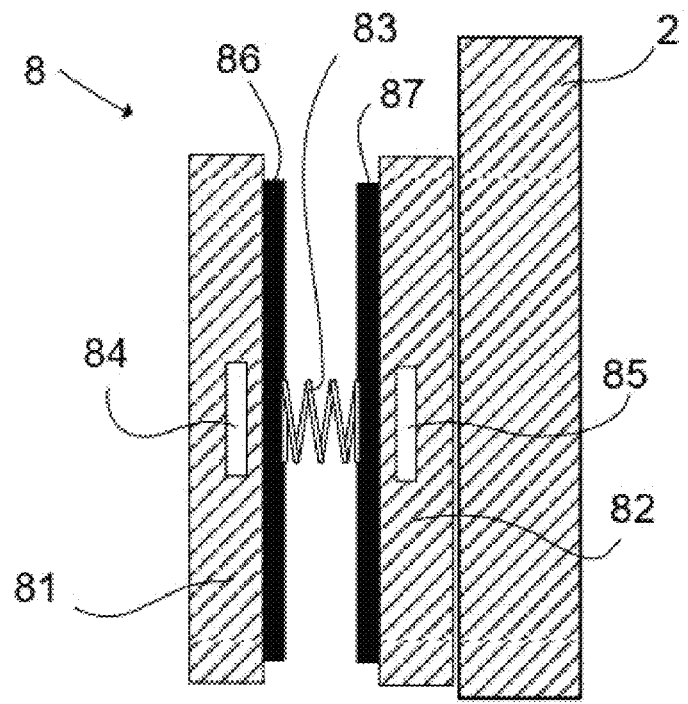
FIG. 4B shows the locking mechanism of the vehicle door hinge according to an embodiment of the present disclosure where the discs are biased towards an unlocked position.
Figure 4C:
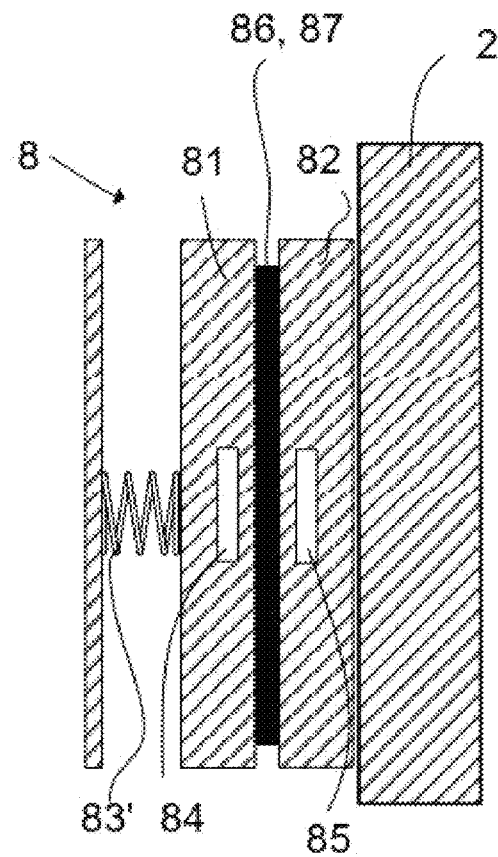
FIG. 4C shows the locking mechanism of the vehicle door hinge according to an embodiment of the present disclosure where the discs are biased towards a locked position.

The locking mechanism 8 of FIGS. 1-3 comprises two discs 81, 82 as shown in FIGS. 4A-4C, where the discs lockingly engage each other in the locked position. As shown in FIG. 4A the disks have protrusions 86, 87 on one side that will hinder rotation if that side of each of the discs 81, 82 are pressed together.

In FIG. 4C the locking mechanism comprises bias means 83 for biasing of the discs to the locked position. The bias means 83 is a spring 83 pressing the disc 81 towards the other disc 82 so that the protrusions 86 of the first disc 81 engage the protrusions 87 of the second disc 82. The disc 82 is fastened in the first hinge part 2. The locking mechanism 8 further comprises an electromagnet 84 for pulling the discs 81,82 apart in an unlocked state. In FIG. 4C the electromagnet 84 will repel the magnetic counter part 85 to open the locking mechanism 8 to the unlocked position.

In FIG. 4B the locking mechanism 8 comprises bias means for biasing of the discs 81, 82 to the unlocked position. The bias means 83 is a spring 83 pushing the disc 81 apart from the other disc 82 so that the protrusions 86 of the first disc 81 do not engage the protrusions 87 of the second disc 82. The bias spring 83 is rotatably attached or just abutting at least one of disc 81 or disc 82 so that the disc 81 and the disc 82 can rotate relative each other unhindered by the spring 83. The disc 82 is fastened in the first hinge part 2. The locking mechanism 8 comprises an electromagnet 84 for pulling the discs 81, 82 together in a locked state. The electromagnet 84 pulls the magnetic counter part 85 towards it pressing the disc 81 towards the other disc 82 so that the protrusions 86 of the first disc 81 engage the protrusions 87 of the second disc 82 in the locked position.

In FIG. 1 the vehicle door hinge 1 is fully open. The gas spring 10 holds the second hinge part 3 and thereby the tailgate 4 in an open position. The stopper part 7 hangs freely as the locking mechanism 8 is in the unlocked position. The stopper part 7 will always hang downwards as it pivots around the pivot attachment means 6 at is upper end and the mass center M of the stopper part is placed in the middle of the stopper part or optionally even further away from the pivot attachment means 6.

In FIG. 2 the sensor 9 has detected a nearby object 11 hindering a full opening of the tailgate 4. In the position shown in FIG. 2 the locking mechanism 8 is actuated. The locking mechanism will lock the second hinge part 3 to the stopper part 7. The stopper part 7 will then hinder any further rotation upwards of the second hinge part 3 and the tailgate 4. The tailgate 4 is saved from being damaged by the object 11.

In FIG. 3 the locking mechanism 8 is still locked in the position of FIG. 2, but the tailgate 4 is rotated downwards towards a closed position. The stopper part 7 is still locked in the maximum position for avoiding damaging the tailgate by opening the tailgate into the object 11.

The person skilled in the art realizes that the present disclosure is not limited to the preferred embodiments described above. The person skilled in the art further realizes that modifications and variations are possible within the scope of the appended claims. For example, if biasing the stopper part 7 the vehicle door hinge 1 works as a side door hinge for a vehicle. Additionally, variations to the disclosed embodiments can be understood and effected by the skilled person in practicing the claimed disclosure, from a study of the drawings, the disclosure, and the appended claims.

What is claimed is:

1. A vehicle door hinge for a vehicle door opening vertically, comprising:
   a first hinge part adapted to be attached to a vehicle frame comprising a pivot attachment means,
   a second hinge part adapted to be attached to the vehicle door attached to the pivot attachment means of the first hinge part configured to allow the second hinge part to rotate the vehicle door in an opening direction or closing direction between a closed position and an open position,
   a stopper part attached to the pivot attachment means of the first hinge part at a distance from a mass centre of the stopper part,
   a locking mechanism for locking the stopper part position relative the second hinge part, wherein the locking mechanism is moveable between an unlocked position and a locked position,
   wherein the stopper part in the unlocked position is arranged to be moved by gravity to a resting position where it is adjacent or abutting the first hinge part and stopped by the first hinge part from rotating in the opening direction but free to rotate in the other direction.

2. The vehicle door hinge according to claim 1, further comprising a sensor configured to determine a distance to an object and to actuate the locking mechanism to transit from the unlocked position to the locked position when the determined distance is shorter than a predetermined distance.

3. The vehicle door hinge according to claim 2, wherein the locking mechanism is actuated electrically based on: a signal from the sensor, a signal from a user-operated button, a signal from the vehicle control system based on a setting for maximum opening position.

4. The vehicle door hinge according to claim 1, wherein the sensor is a sensor comprised in the group of: an IR-sensor, a radar, LIDAR, an ultrasound transceiver, laser sensor, mechanical pressure sensor.

5. The vehicle door hinge according to claim 1, wherein the locking mechanism comprises two discs where the discs lockingly engage each other in the locked position.

6. The vehicle door hinge according to claim 5, wherein the locking mechanism further comprises bias means for biasing of the discs to the locked position.

7. The vehicle door hinge according to claim 6, wherein the bias means is a spring or a resilient member.

8. The vehicle door hinge according to claim 7, wherein the locking mechanism further comprises an electromagnet for pulling the discs apart in an unlocked state.

9. The vehicle door hinge according to claim 6, wherein the locking mechanism further comprises bias means for biasing of the discs to the unlocked position.

10. The vehicle door hinge according to claim 7, wherein the locking mechanism further comprises an electromagnet for pulling the discs together in a locked state.

11. A tailgate hinge comprising the vehicle door hinge according to claim 1.

12. The tailgate hinge according to claim 11, wherein the tailgate has a gas spring actuator for opening the tailgate.

13. A side door hinge comprising
a first hinge part adapted to be attached to a vehicle frame comprising a pivot attachment means,
a second hinge part adapted to be attached to the vehicle door attached to the pivot attachment means of the first hinge part configured to allow the second hinge part to rotate the vehicle door in an opening direction or closing direction between a closed position and an open position,
a stopper part attached to the pivot attachment means of the first hinge part at a distance from a mass centre of the stopper part,
a locking mechanism for locking the stopper part position relative the second hinge part, wherein the locking mechanism is moveable between an unlocked position and a locked position,
wherein the stopper part in the unlocked position is biased to be moved to a resting position where it is adjacent or abutting the first hinge part and stopped by the first hinge part from rotating in the opening direction but free to rotate in the other direction.

14. A vehicle comprising the vehicle door hinge according to claim 1.

15. A vehicle comprising the tailgate hinge according to claim 11.

16. A vehicle comprising the side door hinge according to claim 13.

* * * * *